(12) United States Patent
Mueller et al.

(10) Patent No.: US 9,162,570 B2
(45) Date of Patent: Oct. 20, 2015

(54) TRANSFER CASE WITH HIGH EFFICIENCY CLUTCH ACTUATOR

(71) Applicant: Magna International, Troy, MI (US)

(72) Inventors: Joseph G. Mueller, Clarkston, MI (US); Douglas O. Bradley, Sterling Heights, MI (US); Bradley R. Larkin, Shelby Township, MI (US)

(73) Assignee: Magna International, Troy, MI (US)

( * ) Notice: Subject to any disclaimer, the term of this patent is extended or adjusted under 35 U.S.C. 154(b) by 0 days.

(21) Appl. No.: 14/474,856

(22) Filed: Sep. 2, 2014

(65) Prior Publication Data

US 2014/0366685 A1 Dec. 18, 2014

Related U.S. Application Data

(63) Continuation of application No. 13/850,584, filed on Mar. 26, 2013, now Pat. No. 8,821,334, which is a continuation of application No. PCT/US2011/052562, filed on Sep. 21, 2011.

(60) Provisional application No. 61/386,805, filed on Sep. 27, 2010.

(51) Int. Cl.
| | |
|---|---|
| *F16H 37/06* | (2006.01) |
| *B60K 23/08* | (2006.01) |
| *B60K 17/35* | (2006.01) |
| *F16H 63/18* | (2006.01) |
| *F16H 61/28* | (2006.01) |

(52) U.S. Cl.
CPC ............. *B60K 23/0808* (2013.01); *B60K 17/35* (2013.01); *B60K 23/08* (2013.01); *F16H 37/065* (2013.01); *F16H 63/18* (2013.01); *F16H 2061/2869* (2013.01); *Y10T 74/19019* (2015.01)

(58) Field of Classification Search
None
See application file for complete search history.

(56) References Cited

U.S. PATENT DOCUMENTS

| | | | | |
|---|---|---|---|---|
| 5,330,030 | A * | 7/1994 | Eastman et al. | 180/233 |
| 5,407,024 | A * | 4/1995 | Watson et al. | 180/248 |
| 5,499,951 | A * | 3/1996 | Showalter | 475/204 |
| 5,584,776 | A * | 12/1996 | Weilant et al. | 475/213 |
| 8,267,833 | B2 * | 9/2012 | Mueller et al. | 475/302 |
| 2006/0128515 | A1 * | 6/2006 | Mueller et al. | 475/210 |

* cited by examiner

*Primary Examiner* — Justin Holmes
(74) *Attorney, Agent, or Firm* — Dickinson Wright PLLC

(57) ABSTRACT

A multi-speed power transmission device includes an input shaft, first and second output shafts and a planetary gearset. An axially moveable sleeve fixes the first output shaft and the input shaft for rotation when in a first position and the sleeve fixes the sun gear and the input shaft for rotation when in a second position. A hub is axially moveable and free to rotate relative to the first output shaft when in the first position. The hub is fixed for rotation with the first output shaft when in the second position. A cam plate is continuously fixed for rotation with the carrier and urges the hub toward its second position when in a second axial position. The input shaft drives the first output shaft at a reduced speed via the planetary gearset when the sleeve, hub and cam plate are at their second positions.

23 Claims, 10 Drawing Sheets

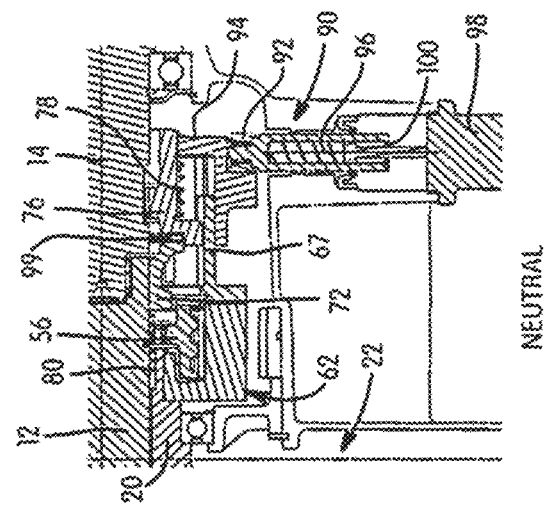
Fig. 5A HIGH
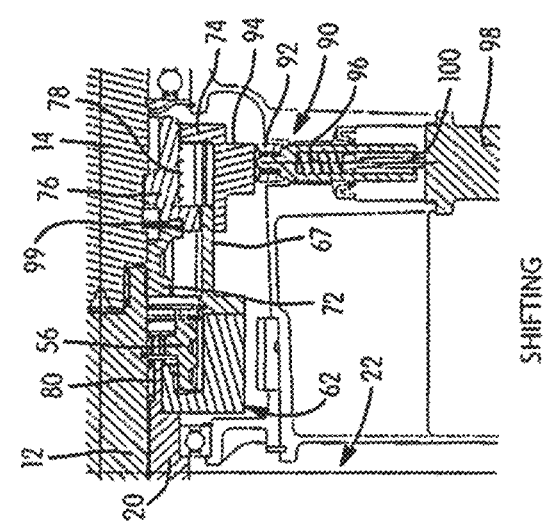
Fig. 5B SHIFTING
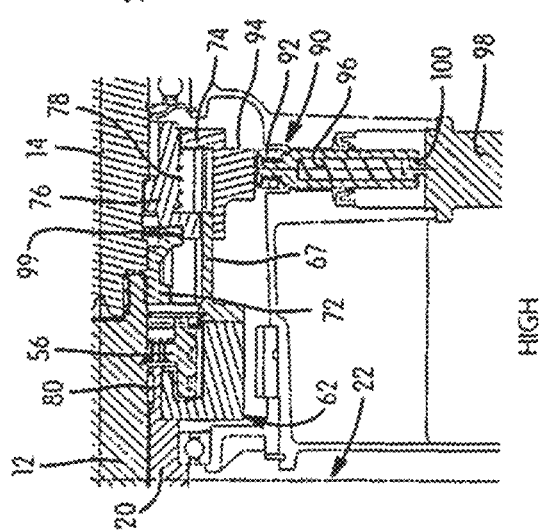
Fig. 5C NEUTRAL

CARRIER SPLINE BLOCKED

SUN SPLINE BLOCKED

LOW

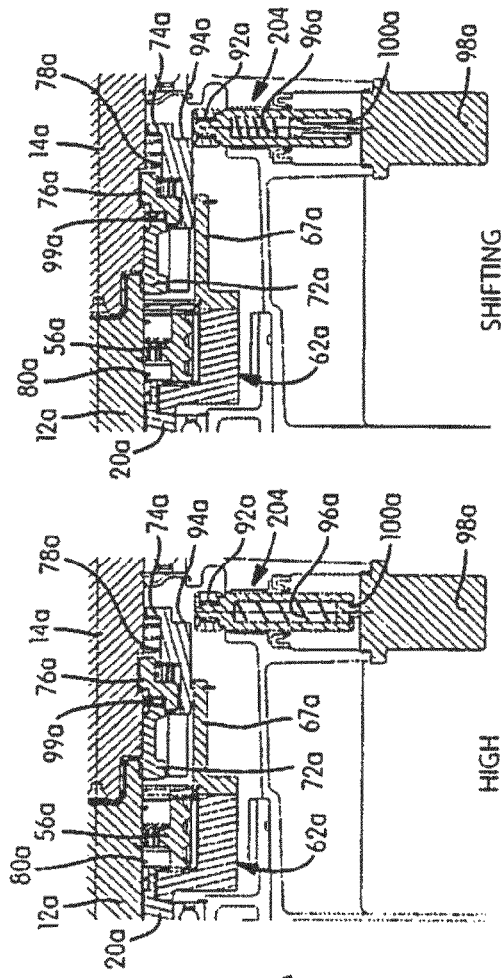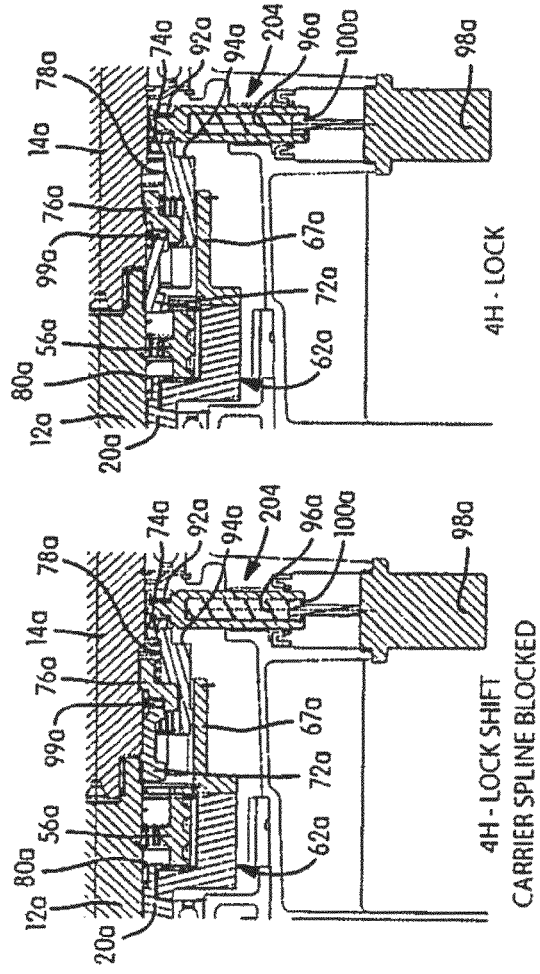

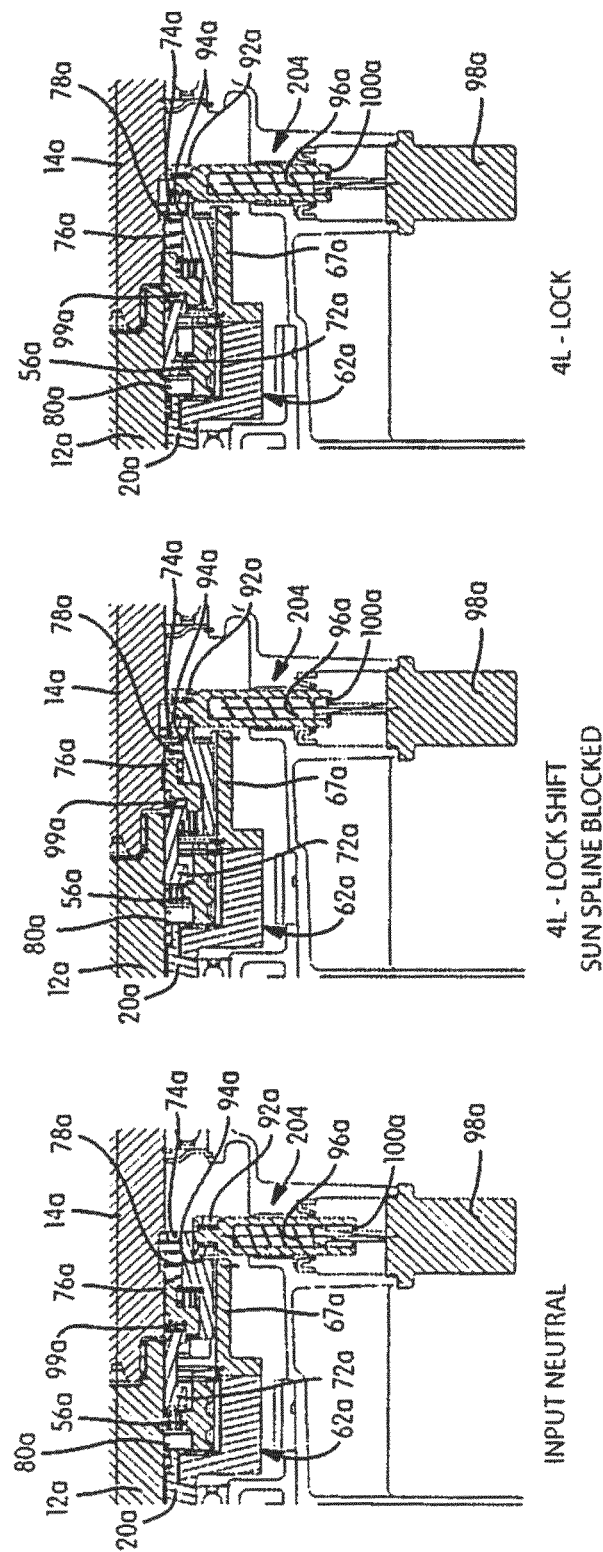

US 9,162,570 B2

TRANSFER CASE WITH HIGH EFFICIENCY CLUTCH ACTUATOR

CROSS-REFERENCE TO RELATED APPLICATIONS

This is a continuation of U.S. application Ser. No. 13/850,584 filed Mar. 26, 2013, now U.S. Pat. No. 8,821,334 which is a continuation of international Application No. PCT/US2011/052562 having an international filing date of Sep. 21, 2011, which claims the benefit of U.S. Provisional Application No. 61/386,805 filed Sep. 27, 2010. The entire disclosures of the above-noted applications are herein incorporated by reference in their entirety.

BACKGROUND

Vehicles have been equipped with power transfer devices such as transfer cases for many years. Typically, transfer cases allow operation of the vehicle in a two-wheel drive mode or a four-wheel drive mode. Some transfer cases also provide multi-speed functionality.

Over the years, original equipment manufacturers have struggled to provide low cost and energy efficient transfer cases. For example, most transfer cases include wet clutches which exhibit oil churning losses as well as lubrication pump losses. In addition, some actuation systems require a relatively high electrical current draw to activate range and mode shifting systems.

Some of the two-speed transfer cases are relatively complex requiring a large number of relatively expensive components to provide the desired functions. In the past, dedicated single-speed or multi-speed transfer cases either shared few components or a single-speed version occupied the same packaging volume as the multi-speed version. Accordingly, it may be desirable to provide an optimized transfer case having a modular design to meet single-speed or multi-speed applications while maximizing the efficiency of the transfer case by minimizing the energy losses during operation.

SUMMARY

This section provides a general summary of the disclosure, and is not a comprehensive disclosure of its full scope or all of its features.

A multi-speed power transmission device includes an input shaft, first and second output shafts and a planetary gearset. The planetary gearset includes a sun gear, a non-rotary annulus gear, pinion gears meshed with the sun gear and the annulus gear, and a carrier rotatably supporting the pinion gears. An axially moveable sleeve fixes the first output shaft and the input shaft for rotation when in a first position and the sleeve fixes the sun gear and the input shaft for rotation when in a second position. A hub is axially moveable and free to rotate relative to the first output shaft when in a first position. The hub is fixed for rotation with the first output shaft when in a second position. An axially moveable cam plate is continuously fixed for rotation with the carrier and urges the hub toward its second position when moved from a first axial position into a second axial position. The input shaft drives the first output shaft at a reduced speed via the planetary gearset when the sleeve, hub and the cam plate are at their second positions.

A multi-speed power transmission device for a vehicle includes an input shaft, first and second output shafts and a planetary gearset. The planetary gearset includes a sun gear, a non-rotary annulus gear, pinion gears meshed with the sun gear and the annulus gear, and a carrier rotatably supporting the pinion gears. A sleeve is moveable to drivingly couple and decouple the sun gear with the input shaft. A cam plate is axially moveable between first and second positions. The cam plate is continuously fixed for rotation with the carrier and includes a helical cam surface that reacts an axial load such that rotation of the cam plate causes axial translation of the cam plate to control the sleeve position. The input shaft drives the first output shaft at a reduced speed via the planetary gearset when the cam plate is at its second position and the sleeve drivingly couples the sun gear to the input shaft.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 5A-5F are fragmentary sectional views depicting components of a range shift mechanism in positions corresponding to various operating modes;

FIGS. 8A-8G are fragmentary sectional views depicting components of a range shift mechanism in positions corresponding to various operating modes;

Corresponding reference numerals indicate corresponding parts throughout the several views of the drawings.

DETAILED DESCRIPTION

Figure 1:
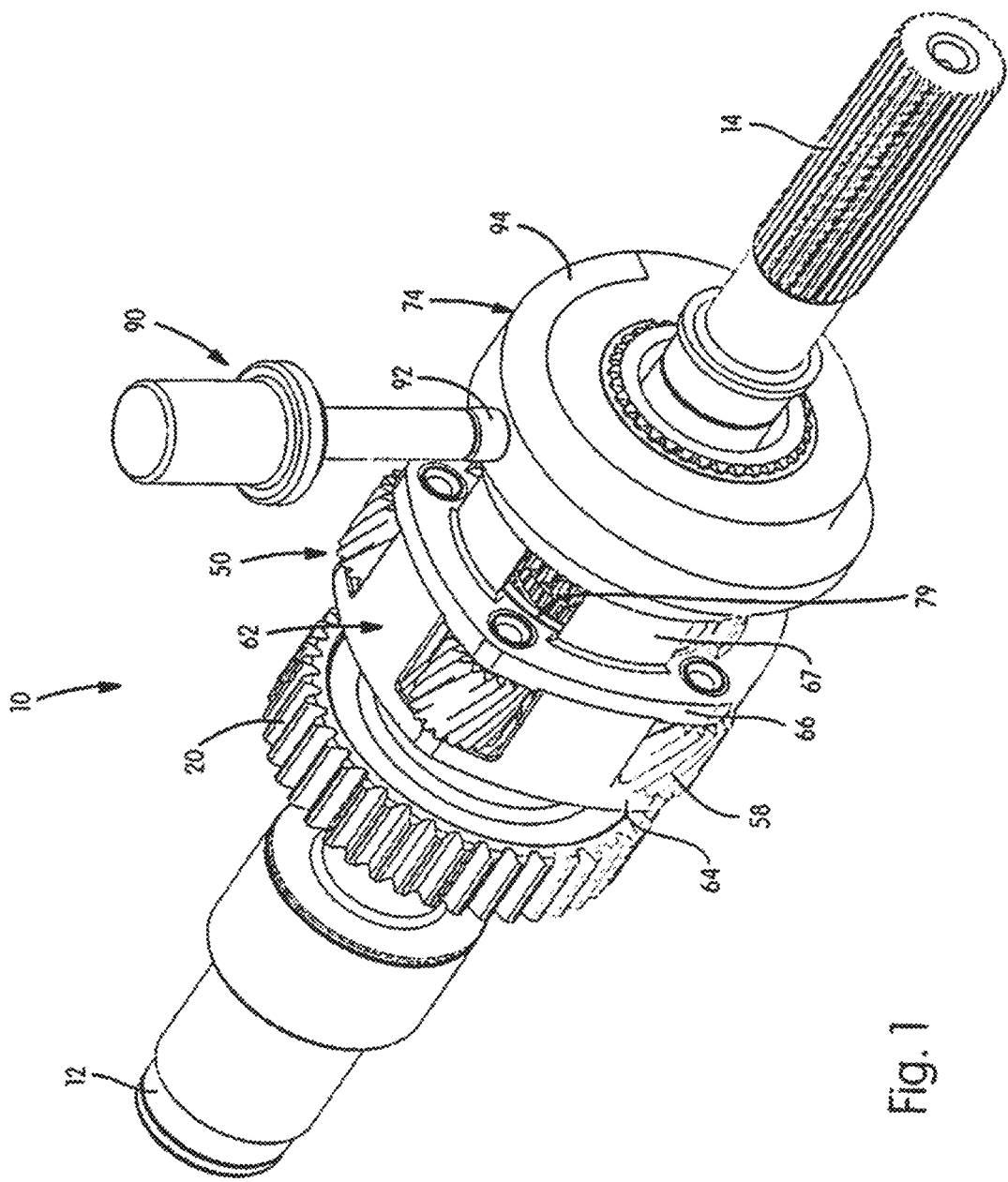
FIG. 1 is a fragmentary perspective view of a portion of a high efficiency transfer case constructed in accordance with the teachings of the present disclosure.

Example embodiments will now be described more fully with reference to the accompanying drawings.

FIGS. 1-5F depict a two-speed transfer case 10 having an input shaft 12, a first output shaft 14 and a second output shaft 16. A dry multi-plate clutch 18 selectively interconnects input shaft 12 with a drive sprocket 20 of a power transfer mechanism 22. Drive sprocket 20 is shown to be rotatably mounted on input shaft 12. Power transfer mechanism 22 also includes a driven sprocket 24 fixed for rotation with second output shaft 16. A flexible drive member or chain 26 drivingly interconnects drive sprocket 20 with driven sprocket 24. Directly intermeshed gears may alternatively be used.

Clutch 18 includes a drum 30 fixed for rotation with drive sprocket 20. A plurality of outer clutch plates 32 are fixed for rotation with and are axially moveable relative to drum 30. A hub 34 is integrally formed with input shaft 12. A plurality of inner clutch plates 36 are fixed for rotation with and are axially moveable relative to hub 34. An apply plate 38 is in splined engagement with input shaft 12 and is axially moveable to compress inner clutch plates 36 into engagement with outer clutch plates 32 and transfer torque across clutch 18. A coil 40 is selectively energizable to produce a magnetic field to attract an armature 42. Armature 42 is fixed with apply plate 38 such that energizing coil 40 controls the magnitude of torque transferred across clutch 18. Bearings 28 and 31 rotatably support drum 30 and drive sprocket 20 within a housing assembly 33.

A planetary gearset 50 is operable to transfer torque from input shaft 12 to first output shaft 14 and drive sprocket 20 at a direct drive ratio of 1:1 or a reduced drive ratio providing a torque multiplication. Planetary gearset 50 includes an annulus 52 fixed to a rear housing 54, a sun gear 56 and a plurality of pinion gears 58 in constant mesh with annulus 52 and sun gear 56. Each of pinion gears 58 are supported for rotation on a pinion pin 60 that forms a portion of a carrier 62. Carrier 62 also includes a front carrier plate 64 fixed for rotation with drive sprocket 20 and a rear carrier plate 66. Rear carrier plate 66 includes a plurality of circumferentially spaced apart and axially extending lugs 67.

A range shift mechanism 70 is operable to place transfer case 10 in one of a reduced output shaft speed or low mode, a neutral mode or a high mode of operation. Range shift mechanism 70 includes a sleeve 72 movable to selectively drivingly interconnect input shaft 12 and first output shaft 14. As shown, sleeve 72 has internal splines engaging external splines on input shaft 12 and external splines on first output shaft 14 to facilitate sliding movement of sleeve 72. A two-wheel drive high mode of operation may be provided by placing clutch 18 in an open, non-torque transferring mode and positioning sleeve 72 as shown in FIG. 5A and identified as "HIGH." All planetary gearset components are stationary at this time and torque is transferred from input shaft 12 to first output shaft 14 through sleeve 72.

Figure 2:
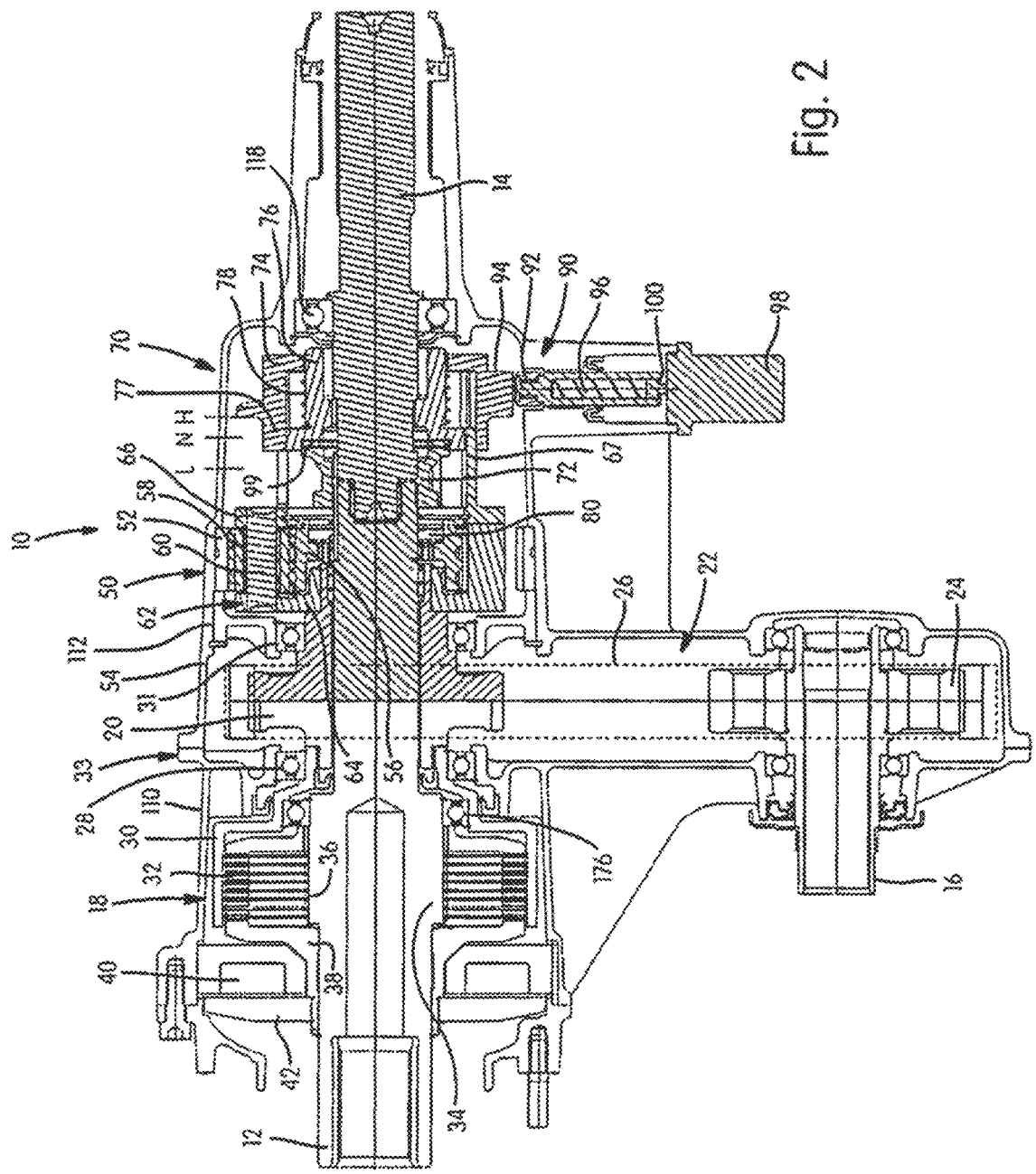
FIG. 2 is a cross-sectional side view taken through the transfer case.
Figure 3:
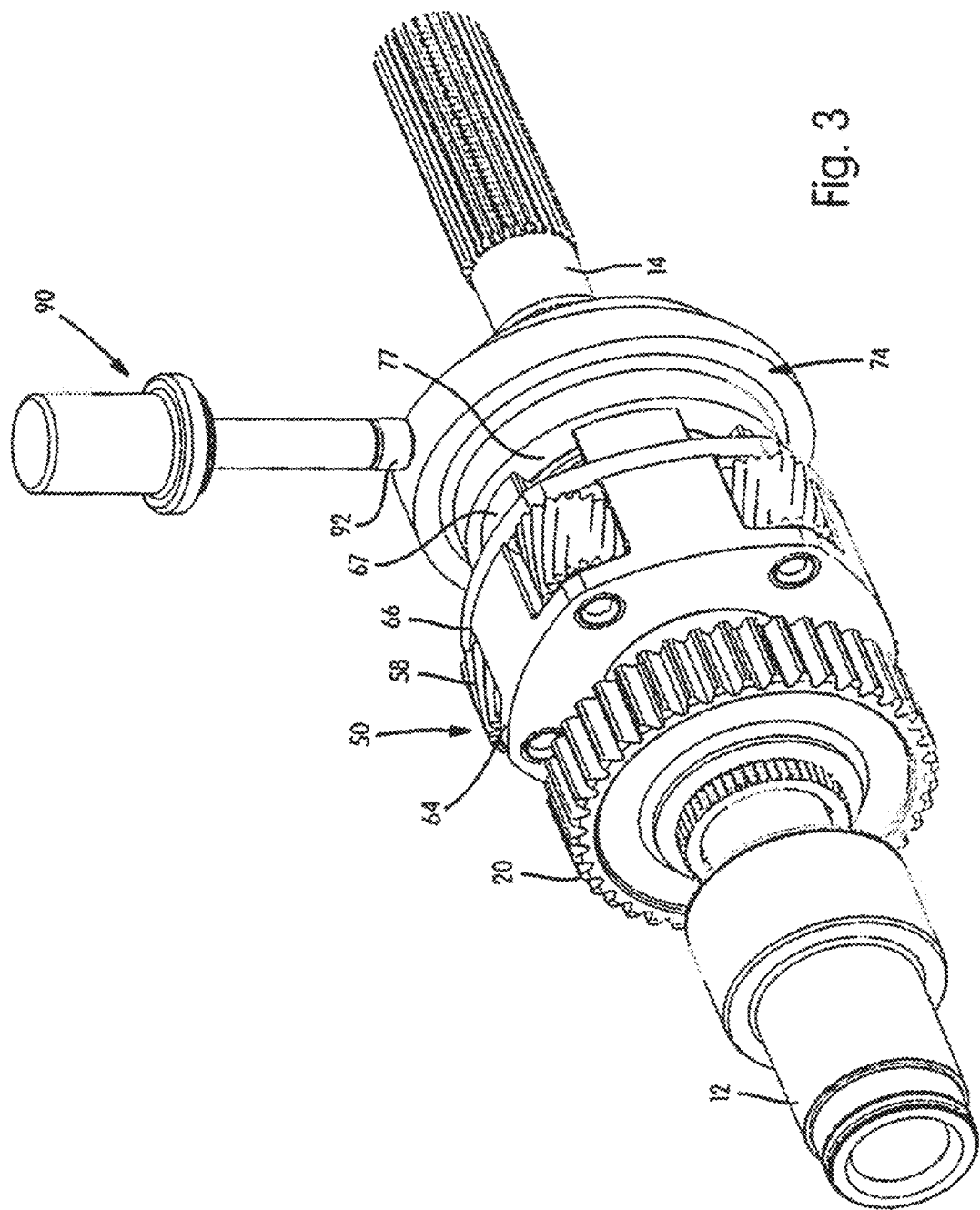
FIG. 3 is a fragmentary perspective view of a portion of the transfer case depicted in the previous Figures.
Figure 4:
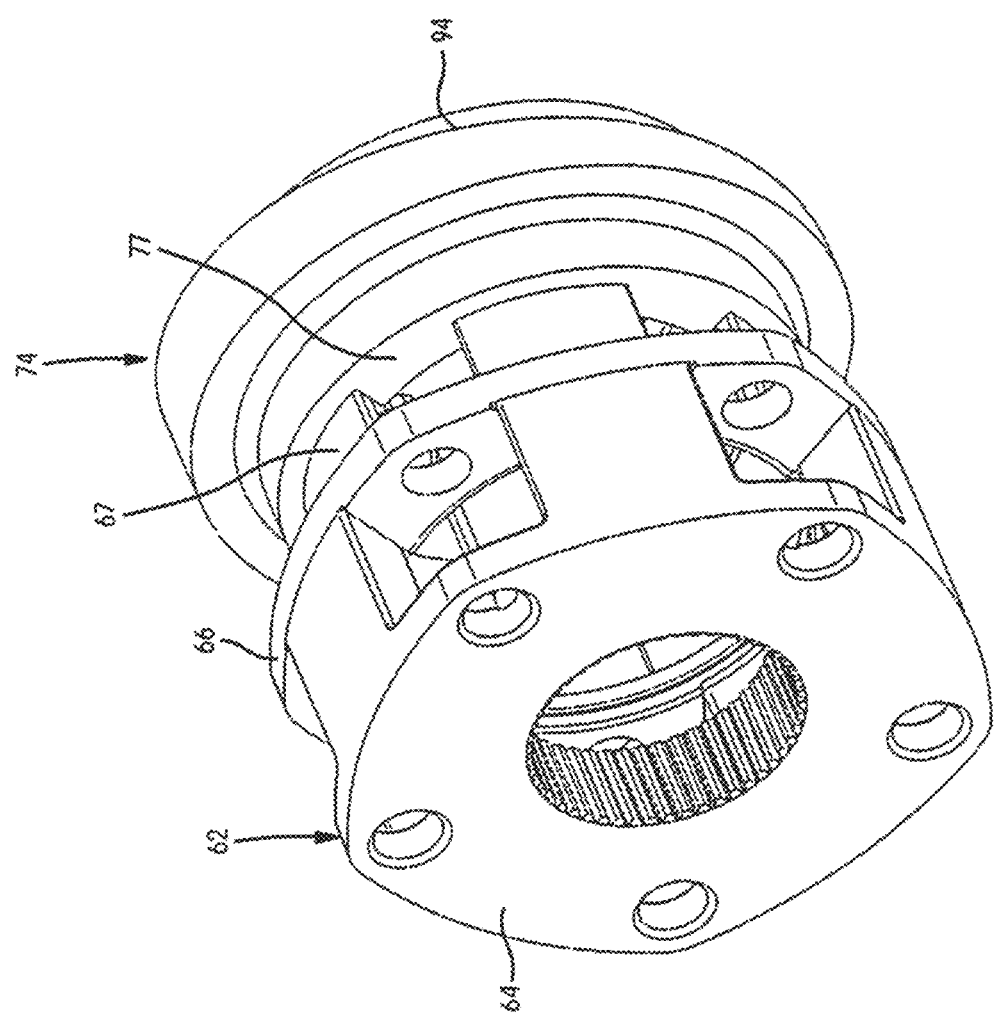
FIG. 4 is fragmentary perspective view of a carrier and a rotary cam.

Range shift mechanism 70 also includes a rotary cam 74 splined on a hub 76 which is configured to surround a portion of first output shaft 14. Rotary cam 74 includes a plurality of radially inwardly extending lugs 77 drivingly engaged with carrier lugs 67. Engagement of lugs 77 on rotary cam 74 with carrier lugs 67 on rear carrier plate 66 permits sliding movement of rotary cam 74 relative to planetary gearset 50 while interconnecting rotary cam 74 and hub 76 for common rotation with carrier 62. A cam spring 78 urges cam 74 to the right as shown in FIG. 2. A retaining ring 79 restricts lugs 77 from disengaging lugs 67. A return spring 80 acts between drive sprocket 20 and sleeve 72 and normally urges sleeve 72 toward the right as shown in FIG. 2.

A range actuator 90 includes a cam follower 92 selectively engageable with a cam surface 94 of rotary cam 74. A solenoid 98 drives a pin 100 to translate cam follower 92. A spring 96 allows relative axial movement between pin 100 and cam follower 92. Rotation of cam 74 causes axial translation of cam 74 and provides range shift control, as will be described.

Based on the relative position of the components previously described, it should be appreciated that sun gear 56 may be selectively connected and disconnected with input shaft 12. Carrier 62 may be selectively coupled and decoupled for rotation with first output shaft 14. When sun gear 56 is disconnected from input shaft 12, a direct speed ratio of 1:1 is produced between the input shaft and output shafts. When sun gear 56 is drivingly connected to input shaft 12 and carrier 62 is drivingly coupled with first output shaft 14, a reduced speed ratio of approximately 2.7:1 is achieved between the input and output shafts. Other ratios are also contemplated.

When transfer case 10 is operating in the two-wheel drive high mode of operation depicted in FIG. 5A, it should be appreciated that an active all-wheel drive mode is also available. During this mode, clutch 18 is modulated to send torque to second output shaft 16 via drive sprocket 20 and power transfer mechanism 22. When clutch 18 is activated, planetary gearset 50 rotates but does not transmit torque.

To achieve a high range mode of operation, coil 40 is activated to cause torque to be transferred from input shaft 12 through clutch 18, drum 30, drive sprocket 20 and provide input to carrier 62. In this manner, the energy for the range shift is provided by the vehicle driveline and not a separate actuator. Coil 40 is activated during the range shift so that the components of range shift mechanism 70 rotate as the vehicle is driven in a forward direction. Clutch 18 is deactivated once the shift is complete. Solenoid 98 is actuated but only a low current is required to axially translate cam 74 to the "H" position shown in FIG. 2. With rotary cam 74 located at the "H" position, sleeve 72 is located in a first position and couples input shaft 12 and first output shaft 14. In addition, hub 76 is shown in a first position whereat hub 76 is decoupled from first output shaft 14.

FIGS. 5B and 5C labeled "SHIFTING" and "NEUTRAL", respectively, depict a shift from the high range to a neutral mode of operation. When neutral is selected, coil 40 is activated to engage clutch 18 and range shift mechanism 70 activates solenoid 98 to extend pin 100 and cause cam follower 92 to engage rotary cam 74. Depending on the rotational position of cam 74, follower 92 may be restricted from accessing cam surface 94. If so, spring 96 compresses as shown in FIG. 5B. As the vehicle moves, rotation of carrier 62 causes rotary cam 74 to rotate allowing follower 92 to engage cam surface 94. The energy supplied from the vehicle driveline continues to drive rotary cam 74 thereby causing cam 74 to move axially to the neutral "N" position and translate hub 76 and sleeve 72 to intermediate positions to disengage sleeve 72 from first output shaft 14. An axial thrust bearing 99 is positioned between hub 76 and sleeve 72. Coil 40 is then deactivated for producing the neutral mode. During the neutral mode of operation, the internal combustion engine may continue to run without causing vehicle motion. Alternatively, the vehicle may be towed without back-driving the transmission.

Figure 5D:
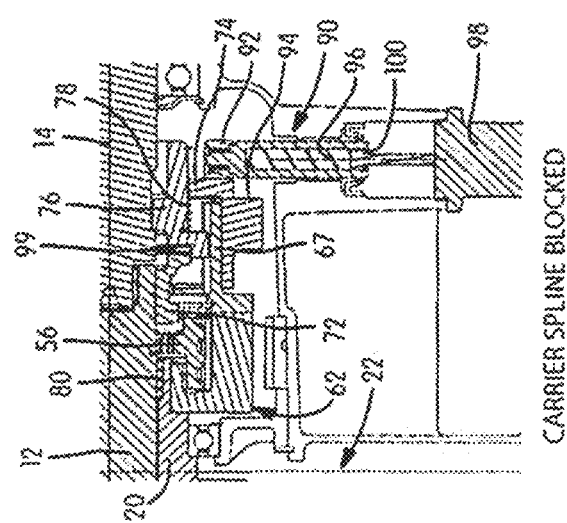
Figure 5E:
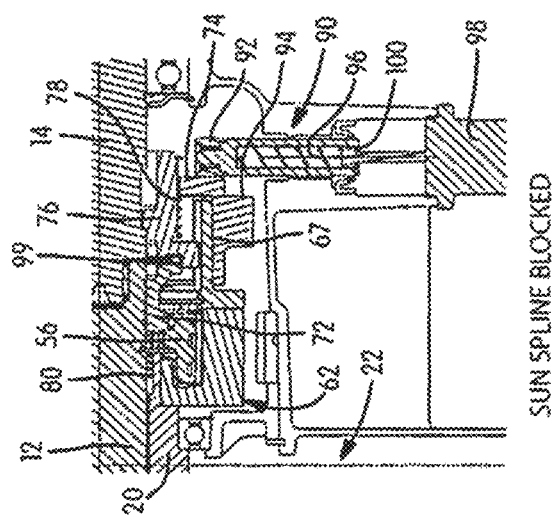
Figure 5F:
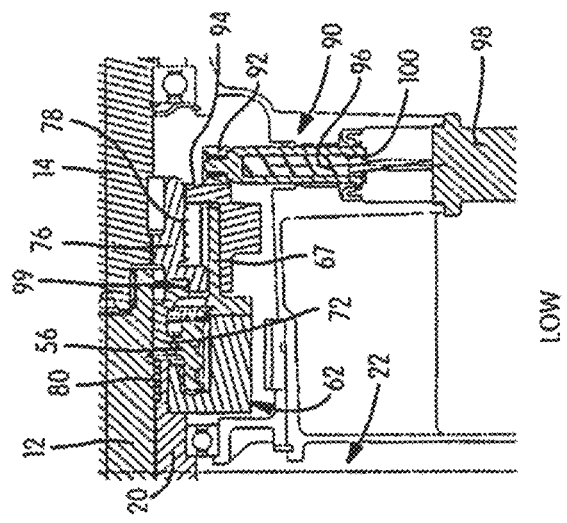

A locked four-wheel drive low range mode may be obtained by activating coil 40 to engage clutch 18 and activating solenoid 98 and causing the shift system components to move to the positions identified in FIGS. 5D, 5E and 5F entitled "CARRIER SPLINE BLOCKED", "SUN SPLINE BLOCKED", and "LOW." To shift to the low range mode, coil 40 is activated during the shift so that the components rotate as the vehicle is driven in the forward direction. Clutch 18 is opened once the shift is complete. Rotation of rotary cam 74 caused by rotation of carrier 62 causes simultaneous axial translation of cam 74 to the "L" position (FIG. 2) when cam follower 92 engages earn surface 94 as depicted in FIGS. 5D, 5E and 5F. It should be appreciated that the full axial extent of translation into its second position cam 74 occurs regardless of whether a carrier spline blocking condition or a sun spline blocking condition exists. It a carrier spline engagement is blocked, as depicted in FIG. 5D, spring 78 compresses to load hub 76 toward the left as viewed in the Figure. Once the blocking condition has cleared, hub 76 moves into its second position whereat the internal splines formed on hub 76 drivingly engages the external splines formed on first output shaft 14.

FIG. 5E depicts a condition where the splined engagement between sun gear 56 and sleeve 72 is blocked. At this time, spring 80 is compressed. Once the blocking condition clears, sleeve 72 moves into its second position such that sun gear 56 and sleeve 72 are fixed for rotation with one another as well as hub 76 and first output shaft 14.

Figure 6:
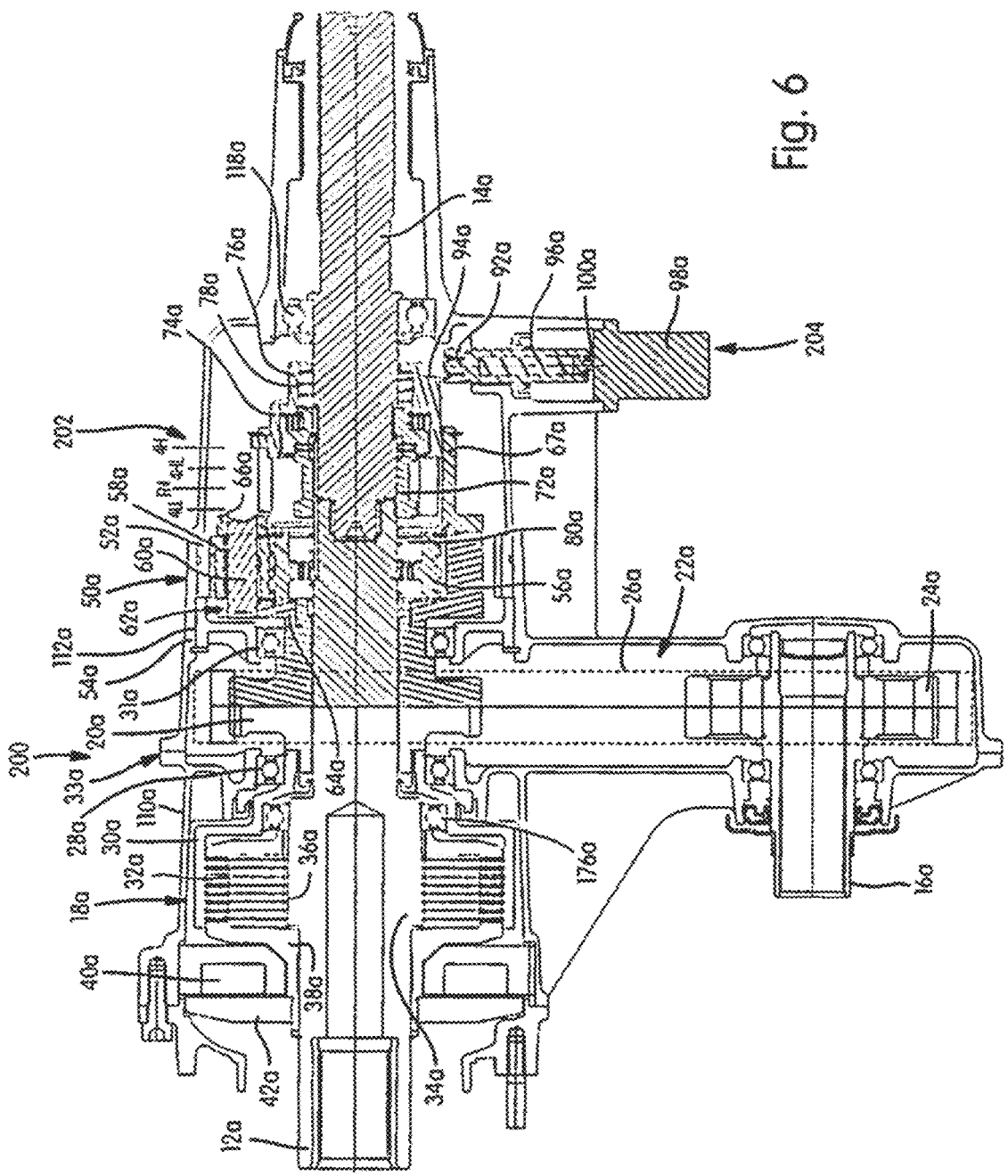
FIG. 6 is a cross-sectional view taken through an alternate transfer case.
Figure 7:
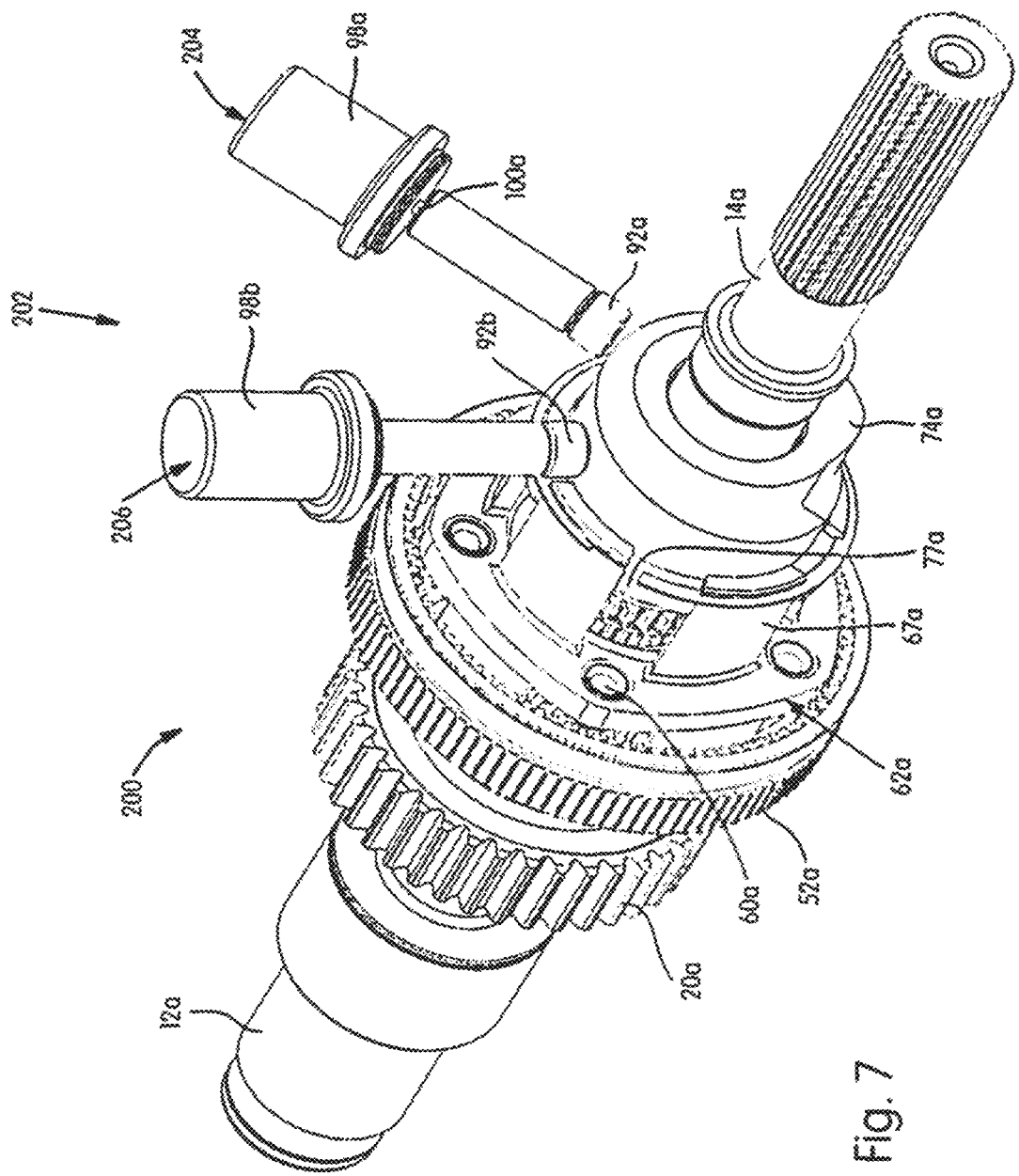
FIG. 7 is a fragmentary perspective view of a portion of the transfer case shown in FIG. 6.

An alternate transfer case 200 is depicted at FIGS. 6-8. Transfer case 200 is substantially similar to transfer case 10. As such, similar elements will be identified with like numerals include a lower "a" suffix. Transfer case 200 provides additional modes of operation over and above those previously described in relation to transfer case 10. In particular, transfer case 200 is operable to provide a locked four-wheel drive low range mode of operation, a neutral mode, a locked four-wheel drive high range mode, and a high range mode of operation that may operate as a two-wheel drive mode or an adaptively controlled four-wheel drive high mode.

Transfer case 200 includes a range shift mechanism 202 where the energy for shifting is supplied by the kinetic energy of the vehicle as previously described in relation to transfer case 10. Shift mechanism 202 includes a first linear actuator assembly 204 and second linear actuator assembly 206. Each of the linear actuators is configured substantially similarly to range actuator 90. As such, the elements will be identified as before with "a" suffix elements relating to linear actuator assembly 204 and "b" suffix elements relating to linear actuator assembly 206.

First linear actuator assembly 204 is axially positioned at substantially the same location as range actuator 90 previously described. Second linear actuator assembly 206 is axially positioned closer to drive sprocket 20a than first linear actuator assembly 204. By configuring the actuators in this matter, the magnitude of axial translation experienced by cam 74a is doubled. The additional linear travel allows for additional modes of transfer case operation. Specifically, FIG. 6 indicates the position of rotary cam 74a to define the high-range mode "4 H"), the locked four-wheel drive high range mode ("4 HL"), the neutral mode ("N"), and the locked four-wheel low range mode ("4 LL").

With reference to FIGS. 8A-8G, the various operating modes of transfer case 200 are depicted. At Figure BA, the high-range mode of operation includes drivingly interconnecting input shaft 12a with first output shaft 14a via sleeve 72a while hub 76a is decoupled from first output shaft 14a. FIGS. 8B and 8C show a shift from the high range mode to the locked four-wheel drive high range mode of operation at FIG. 8D. The shift is initiated as previously described where actuation of clutch 18a via energization of coil 40 and activation of solenoid 98a causes engagement of cam follower 92a with cam face 94a which causes axial translation of rotary cam 74a to the position depicted in FIG. 8C. If the splined interconnection between first output shaft 14a and hub 76a is blocked, spring 78a compresses. Once the blocking condition clears, hub 76a translates towards the left side of the Figure to fix first output shaft 14a for rotation with hub 76a. At this time, input shaft 12a and first output shaft 14a remain fixed for rotation with one another via sleeve 72a. Carrier lugs 67a engage rotary cam lugs 77a to provide a torque transferring interconnection. Hub 76a is in splined engagement with rotary cam 74a to fix drive sprocket 20a for rotation with first output shaft 14a.

A neutral mode of operation may be obtained by energizing second solenoid 98b and causing rotary cam 74a to rotate and translate to the position depicted in FIG. 8E. At this time, sleeve 72a disengages first output shaft 14a to interrupt the torque path.

FIGS. 8F and 8G relate to shifting from the neutral position to the locked four-wheel drive low range mode. Second solenoid 98b is energized to engage rotary cam face 94a and cause rotary cam 74a to translate further to the left as depicted in FIG. 8F. If the splined interconnection between sun gear 56a and sleeve 72a is momentarily blocked, spring 78a compresses. Once the blocking condition is cleared, a splined interconnection exists between sleeve 72a and sun gear 56a. Spring 80a is fully compressed at this time. Torque provided to input shaft 12a is multiplied via planetary gearset 50a and transferred to first output shaft 14a, via rear carrier plate 66a, rotary cam 74a, and hub 76a. As previously mentioned, carrier 62a is fixed for rotation with drive sprocket 20a to transfer the output of planetary gearset 50a to second output shaft 16a. Torque flows from input shaft 12a through sun gear 56a, planetary pinions 58a, carrier 62a, hub 76a and is provided to first output shaft 14a and second output shaft 16a.

Housing assembly 33 is a transmission adapted to mount to a variety of transmissions. A front housing 110 supports coil 40 and second output shaft 16. A bearing support plate 112 captures the chain loads and the annulus thrust loads. Rear housing 54 supports first output shaft 14. A lubrication system contains a passive lubrication system that pulls oil from a sump via the chain 26 when rotating to lubricate the appropriate bearings and seals. The entire input cavity containing clutch 18 is dry and contains a seal and a bearing 116. A rear output bearing 118, bushing and seal are lubricated via an elevated sump created by an oil dam at the rear output bearing.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A transfer case for a motor vehicle, comprising:
an input shaft;
a first output shaft and a second output shaft;
a power transfer mechanism coupled for rotation with said second output shaft;
a clutch operable in a non-actuated mode to uncouple said power transfer mechanism from said input shaft and in an actuated mode to couple said power transfer mechanism for rotation with said input shaft;
a gearset including a rotary first member, a non-rotary second member, and a rotary third member driven at a reduced speed relative to said first member;
a range shift mechanism including a range sleeve coupled for rotation with said input shaft and axially moveable between a first sleeve position and a second sleeve position, a hub axially moveable between a first hub position and a second hub position, a cam coupled for rotation with said third member of said gearset and axially moveable between a first cam position and a second cam position, and a range actuator operable for causing movement of said cam between its first and second cam positions, wherein said range sleeve is operable in its first sleeve position to couple said first output shaft for rotation with said input shaft and in its second sleeve position to couple said first member of said gearset for rotation with said input shaft, wherein said hub is operable in its first hub position to be uncoupled from said first output shaft and in its second hub position to be coupled for rotation with said first output shaft, wherein said cam is operable in its first cam position to locate said range sleeve in its first sleeve position and said hub in its first hub position and is operable in its second cam position to locate said range sleeve in its second sleeve position and said hub in its second hub position, and wherein said clutch is shifted into its actuated mode to cause rotation of said third member of said gearset and said cam of said range shift mechanism, and wherein said range actuator is actuated to convert rotation of said cam into axial movement of said cam between its first and second cam positions.

2. The transfer case of claim 1 wherein a direct speed ratio drive connection is established between said input shaft and said first output shaft when said range sleeve is in its first sleeve position and said cam is in its first cam position, and wherein a reduced speed ratio drive connection is established between said input shaft and said first output shaft when said range sleeve is in its second sleeve position, and said cam is in its second cam position.

3. The transfer case of claim 2 wherein a two-wheel drive high-range operating mode is established when said clutch is operating in its non-actuated mode and said direct speed ratio drive connection is established between said input shaft and said first output shaft, wherein a four-wheel drive high-range operating mode is established when said clutch is operating in its actuated mode and said direct speed ratio drive connection is established between said input shaft and said first output shaft, and wherein a locked four-wheel drive low-range operating mode is established when said clutch is operating in its non-actuated mode and said reduced speed ratio drive connection is established between said input shaft and said first output shaft.

4. The transfer case of claim 3 wherein said range sleeve is operable in a third sleeve position located between its first and second sleeve positions to uncouple both said first member of said gearset and said first output shaft from said input shaft, wherein said hub is operable in a third hub position located between its first and second hub positions to continue to permit rotation of said hub relative to said first output shaft, wherein said cam is operable in a third cam position located between its first and second cam positions to urge said range sleeve into its third sleeve position and said hub into its third hub position, and wherein a neutral operating mode is established when said clutch is operating in its non-actuated mode and said hub, said sleeve and said cam are each axially located in their corresponding third position.

5. The transfer case of claim 4 wherein said clutch is shifted into its actuated mode to rotate said third member of said gearset and said cam and allow said range actuator to engage said cam which causes axial movement of said cam between its three distinct cam positions for shifting between the operating modes.

6. The transfer case of claim 3 wherein said sleeve is operable in a third sleeve position located between its first and second sleeve positions to maintain coupled engagement with said first output shaft, wherein said hub is operable in a third hub position located between its first and second hub positions to be coupled for rotation with said first output shaft such that said third member of said gearset is coupled via said cam and said hub for rotation with said output shaft, wherein said cam is operable in a third cam position located between its first and second cam positions to located said hub in its third position and said range sleeve in its third position, wherein a locked direct speed ratio is established between said input shaft and said first and second output shafts when said range sleeve is in its third sleeve position, said hub is in its third hub positions and said cam is in its third cam position, and wherein a locked four-wheel high-range drive mode is established when clutch is operable in its non-actuated mode and said locked direct speed ratio drive connection is established.

7. The transfer case of claim 1 wherein said range shift mechanism further includes a first biasing device for normally biasing said range sleeve toward its first sleeve position and said hub toward its first hub position, and a second biasing device for normally biasing said cam toward its first cam position.

8. The transfer case of claim 1 wherein said cam includes a cam surface, and wherein said range actuator is operable in a non-actuated mode to disengage said cam surface and in an actuated mode to engage said cam surface, and wherein engagement of said range actuator with said cam surface causes axial translation of said cam between its first and second positions in response to rotation of said cam due to said clutch operating in its actuated mode.

9. The transfer case of claim 8 wherein said range shift mechanism further includes a second range actuator adapted to selectively engage said cam surface of said cam and cause additional axial translation of said cam to a third cam position.

10. The transfer case of claim 1 wherein said gearset includes a sun gear as its first member, a ring gear as its second member, and a carrier as its third member, wherein said gearset further includes pinion gears rotatably supported from said carrier and which are meshed with said sun gear and said ring gear.

11. The transfer case of claim 10 wherein said power transfer mechanism includes a first transfer member rotatable relative to said input shaft and drivingly coupled to said carrier of said gearset, and a second transfer member fixed for rotation with said second output shaft and being drivingly coupled to said first transfer member.

12. The transfer case of claim 11 wherein said clutch includes a first clutch member fixed for rotation with said input shaft, a second clutch member fixed for rotation with said first transfer member, a clutch pack operably disposed between said first and second clutch members, and a power-operated clutch actuator for selectively applying a clutch engagement force to said clutch pack to transfer torque from said input shaft to said first transfer member for driving said carrier of said gearset and said second output shaft.

13. The transfer case of claim 12 wherein said first transfer member is disposed between said clutch and said gearset, and wherein said gearset is disposed between said first transfer member and said range shift mechanism.

14. The transfer case of claim 12 wherein a high-range mode is established when each of said range sleeve, said hub and said cam is located in its respective first position, and wherein a low-range mode is established when each of said range sleeve, said hub and said cam is located in its respective second position.

15. The transfer case of claim 14 wherein said clutch actuator is released to disengage said clutch pack when the low range drive mode is established, wherein drive torque is transferred from said input shaft to said first output shaft through said sun gear, said pinion gears, said carrier, said cam, and said hub, and wherein drive torque is transferred from said input shaft to said second output shaft through said sun gear, said pinion gears, said carrier and said power transfer mechanism.

16. The transfer case of claim 14 wherein a two-wheel high range mode is established when each of said sleeve, said hub, and said cam is located in its first position and said clutch actuator is released to disengage said clutch pack, and wherein a four-wheel high-range mode is established when each of said sleeve, said hub, and said cam is located in its first position and said clutch actuator is activated to engage said clutch pack and transfer torque to said second output shaft.

17. A transfer case for a vehicle, comprising:
an input shaft;
an output shaft;
a planetary gearset including a sun gear, a non-rotary ring gear, pinion gears meshed with said sun and ring gears, and a carrier rotatably supporting said pinion gears;
a range shift mechanism including a sleeve, a hub, and a cam plate, said sleeve axially moveable between first and second range positions, said sleeve coupling said output shaft for rotation with said input shaft when in its first range position, said sleeve coupling said sun gear for rotation with said input shaft when in its second range position, said hub axially moveable between first and second hub positions, and said hub being uncoupled from said output shaft when in its first position and coupled for rotation with said output shaft when in its second position, and said cam plate axially moveable between first and second cam positions, said cam plate being continuously coupled for rotation with said carrier and urging said hub toward its second hub position when in its second cam position, wherein said input shaft drives said output shaft at a reduced speed when said sleeve, said hub and said cam plate are each located in their second position; and
an actuator for selectively urging said cam plate toward its second position.

18. The transfer case of claim 17 further including a transfer mechanism continuously drivingly interconnecting said carrier and a second output shaft, and a clutch for selectively coupling said input shaft to said transfer mechanism.

19. A transfer case for a motor vehicle, comprising:
an input shaft;
a first output shaft and a second output shaft;
a power transfer mechanism coupled for rotation with the second output shaft;
a clutch operable to selectively couple the power transfer mechanism to the input shaft, and a clutch actuator operable to shift the clutch between a non-actuated mode and an actuated mode;
a planetary gearset including a sun gear, a non-rotary ring gear, pinion gears meshed with the sun gear and the ring gear, and a carrier rotatably supporting the pinion gears, the carrier being coupled for rotation with the power transfer mechanism; and
a range shift mechanism including a sleeve fixed for rotation with and axial sliding movement on the input shaft between a first sleeve position and a second sleeve position, a hub surrounding the first output shaft for axial sliding movement between a first hub position and a second hub position, a rotary cam fixed for rotation with and axial sliding movement relative to the carrier of the planetary gearset between a first cam position and a second cam position, and a range actuator for converting rotary motion of the rotary cam into axial movement of the rotary cam between its first and second cam positions, the sleeve being operable in its first sleeve position to couple the first output shaft for rotation with the input shaft and being operable in its second sleeve position to couple the sun gear for rotation with the input shaft, the hub being operable in its first hub position to rotate relative to the first output shaft and being operable in its second hub position to be coupled for rotation with the first output shaft, the rotary cam being operable in its first cam position to locate the sleeve in its first sleeve position and the hub in its first hub position and being operable in its second cam position to urge the hub into its second hub position and the sleeve into its second sleeve position; and wherein said clutch is shifted into its actuated mode to cause rotation of said carrier of said planetary gearset and said cam of said range shift mechanism, and wherein said range actuator is actuated to convert rotation of said cam into axial movement of said cam between its first and second cam positions.

20. The transfer case of claim 19 wherein a direct speed ratio drive connection is established between the input shaft and the first output shaft when the sleeve is in its first sleeve position, the hub is in its first hub position and the rotary cam is in its first cam position, and wherein a reduced speed ratio drive connection is established between the input shaft and the first output shaft when the sleeve is in its second sleeve position, the hub is in its second hub position and the rotary cam is in its second position.

21. A transfer case for a motor vehicle, comprising:
an input shaft;
an output shaft;
a gearset including a first rotary member and a second rotary member driven at a reduced speed relative to said first rotary member;
a range shaft mechanism including a range sleeve, a cam, and a range actuator, said range sleeve being operable in a first range position to couple said output shaft for rotation with said input shaft and in a second range position to couple said first rotary member of said gearset for rotation with said input shaft, said cam coupled for rotation with said second rotary member of said gearset and being operable in a first cam position to locate said range sleeve in its first range position and in a second cam position to locate said range sleeve in its second range position, wherein said input shaft drives said output shaft at a direct speed ratio when said cam is located in its first cam position and said input shaft drives said output shaft at a reduced speed ratio when said cam is located in its second cam position, said range actuator being operable in a first mode to maintain said cam in one of its first and second cam positions and in a second mode to cause movement of said cam between its first and second positions; and
a clutch for selectively coupling said second rotary member of said gearset for rotation with said input shaft to cause rotation of said cam when said range actuator is operating in its second mode.

22. The transfer case of claim 21 further comprising:
a second output shaft; and
a transfer mechanism continuously interconnecting said second rotary member of said gearset for rotation with said second output shaft;
wherein said clutch is operable for selectively coupling said transfer mechanism to said input shaft, wherein said clutch is operable in a range shifting mode to facilitate rotation of said cam in coordination with operation of said range actuator in its second mode, and wherein said clutch is operable in a drive mode to facilitate transfer of torque from said input shaft to said second output shaft while said range actuator is operating in its first range mode.

23. The transfer case of claim 22 wherein said cam includes a cam surface, and wherein said range actuator is disengaged from said cam surface in its first mode and engaged with said cam surface in its second mode.

* * * * *